(12) United States Patent
Ben-Artzi et al.

(10) Patent No.: US 8,621,442 B2
(45) Date of Patent: Dec. 31, 2013

(54) QUICKER TRANSLATION OF A COMPUTER PROGRAM SOURCE CODE

(75) Inventors: Guy Ben-Artzi, Palo Alto, CA (US);
Yotam Shacham, Palo Alto, CA (US);
Yehuda Levi, Rishon Lezion (IL)

(73) Assignee: Beek Fund B.V. L.L.C., Dover, DE (US)

( * ) Notice: Subject to any disclaimer, the term of this patent is extended or adjusted under 35 U.S.C. 154(b) by 379 days.

(21) Appl. No.: 13/023,642

(22) Filed: Feb. 9, 2011

(65) Prior Publication Data
US 2012/0204157 A1      Aug. 9, 2012

(51) Int. Cl.
*G06F 9/45*      (2006.01)

(52) U.S. Cl.
USPC .......................................... 717/136; 717/154

(58) Field of Classification Search
USPC .................................. 717/136, 154
See application file for complete search history.

(56) References Cited

U.S. PATENT DOCUMENTS

| | | | | |
|---|---|---|---|---|
| 7,318,226 B2* | 1/2008 | Chefalas et al. | ............. | 717/171 |
| 7,831,964 B2* | 11/2010 | Nagashima et al. | .......... | 717/137 |
| 8,327,329 B2* | 12/2012 | Vierzba et al. | ................ | 717/120 |
| 2006/0101429 A1* | 5/2006 | Osborne et al. | ............... | 717/137 |
| 2011/0246968 A1* | 10/2011 | Zhang et al. | .................. | 717/125 |

OTHER PUBLICATIONS

Nagra (Web article:GIF/Javascript Polyglots, dated Feb. 22, 2009, retrieved on Aug. 27, 2013, URL:http://www.thinkfu.com/blog/gifjavascript-polyglots).*

* cited by examiner

*Primary Examiner* — Li B Zhen
*Assistant Examiner* — Hang Pan
(74) *Attorney, Agent, or Firm* — Novak Druce Connolly Bove + Quigg LLP (57) ABSTRACT

Embodiments of methods and systems for managing translation of a source code of a computer application, at a processing device, are described. A pre-translation analysis of the source code may be performed to determine a plurality of look-alike code snippets. Thereafter, a report may be generated for indicating at least one parameter associated with the plurality of look-alike code snippets. Subsequently, at least one of the plurality of look-alike code snippets may be modified with at least one pre-stored code snippet, based on the at least one parameter.

42 Claims, 6 Drawing Sheets

QUICKER TRANSLATION OF A COMPUTER PROGRAM SOURCE CODE

FIELD OF THE INVENTION

Various embodiments of the invention may relate to computer aided translation of programming code and more specifically the invention relates to managing translation of a computer program source code.

BACKGROUND OF THE INVENTION

Various users across the globe communicate or perform various activities on computer and device networks. Moreover, the users interact with each other through the networks, such as the Internet. Typically, the users use devices like personal computers to interact over the Internet. The users can interact from various Internet websites or social networking sites, for example, Facebook, Myspace, Hi5, and Orkut etc. Recently, the development in mobile devices such as cell phones, smart phones and PDAs, computers, laptops and the like has enabled them to be used for performing various activities on networks such as the Internet. Moreover, the mobile devices can be used for real-time interaction with other users on the network. The interaction or communication can be in the form of chatting, playing interactive online games, browsing, shopping, music, video, banking, business and the like.

The rapid pace of innovation in technology has generated various types of devices and platforms. Moreover, the number of devices is increasing rapidly. For example, there are various operating systems available for the devices such as Windows, Linux, Macintosh, Android, and Symbian, etc. Moreover, a large number of J2ME platforms are available for the mobile devices such as cell phones. Furthermore, the mobile devices have a wide range of capabilities in terms of screen size, screen type, screen resolution, processor, and memory etc. The applications for these devices have to be developed based on their platforms. Therefore, each application has to be ported to other platforms. For example, in case computer games the programming languages typically used are JAVA, C#, C++, Action Script, and the like. Therefore, an application developed in Action Script programming language may have to be ported to another programming language when not supported by a device platform. Further, new applications are being continuously developed for different device platforms.

Generally, one may desire to translate program code written in a source computer language for a source Operating System (OS) or device, platform into multiple target computer languages for various target operating systems or device platforms. However, the translation may be difficult, to perform due to various challenges. One of the major challenges is to translate the program code from the source code into one or more target languages. Further, there may be various lines, modules, or snippets of source code that are repeated throughout the source code. Presently, each of these is analyzed separately and then translated into one or more target languages. The process may require a lot of inputs from the programmer and may often end up taking in duplicate inputs from the programmer.

In light of the above discussion, techniques are therefore desirable for quicker translation of a computer program source code.

SUMMARY

Embodiments of the invention may provide a method for managing translation of a computer program source code. The method may comprise: analyzing the source code to determine a presence of a plurality of look-alike code snippets; generating a report to indicate at least one parameter associated with the look-alike code snippets; and modifying at least one of the plurality of look-alike code snippets with at least one pre-stored code snippet, based on the parameter.

Further embodiments of the invention may provide a system for managing translation of a computer program source code. The system may comprise: means for analyzing the source code to determine a presence of a plurality of look-alike code snippets; means for generating a report to indicate at least one parameter associated with the look-alike code snippets; and means for modifying at least one of the plurality of look-alike code snippets with at least one pre-stored code snippet, based on the parameter.

Yet other embodiments of the present invention may further provide an apparatus for managing translation of a source code of a computer application. The apparatus may comprise: a memory for storing at least one pre-stored code snippet; and a processor communicatively coupled to the memory, wherein the processor is configured to: perform a analysis of the source code to determine to determine a presence of a plurality of look-alike code snippets; generate a report to indicate at least one parameter associated with the look-alike code snippets; and modify at least one of the plurality of look-alike code snippets with the at least one pre-stored code snippet, based on the parameter.

Further embodiments of the present invention may also provide a computer-readable medium having stored thereon instructions that, if executed by a processor, cause the processor to execute a method for managing a translation of a source code. The instructions may comprise: analyzing the source code to determine a to determine a presence of a plurality of look-alike code snippets; generating a report to indicate at least one parameter associated with the look-alike code snippets; and modifying at least one of the plurality of look-alike code snippets with at least one, pre-stored code snippet, based on the parameter.

BRIEF DESCRIPTION OF THE DRAWINGS

Having thus described the invention in general terms, reference will now be made to the accompanying drawings, which are not necessarily drawn to scale, and wherein:

DESCRIPTION OF THE INVENTION

Illustrative embodiments of the invention now will be described more fully hereinafter with reference to the accompanying drawings, in which some, but not all embodiments of the invention may be shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Figure 1:
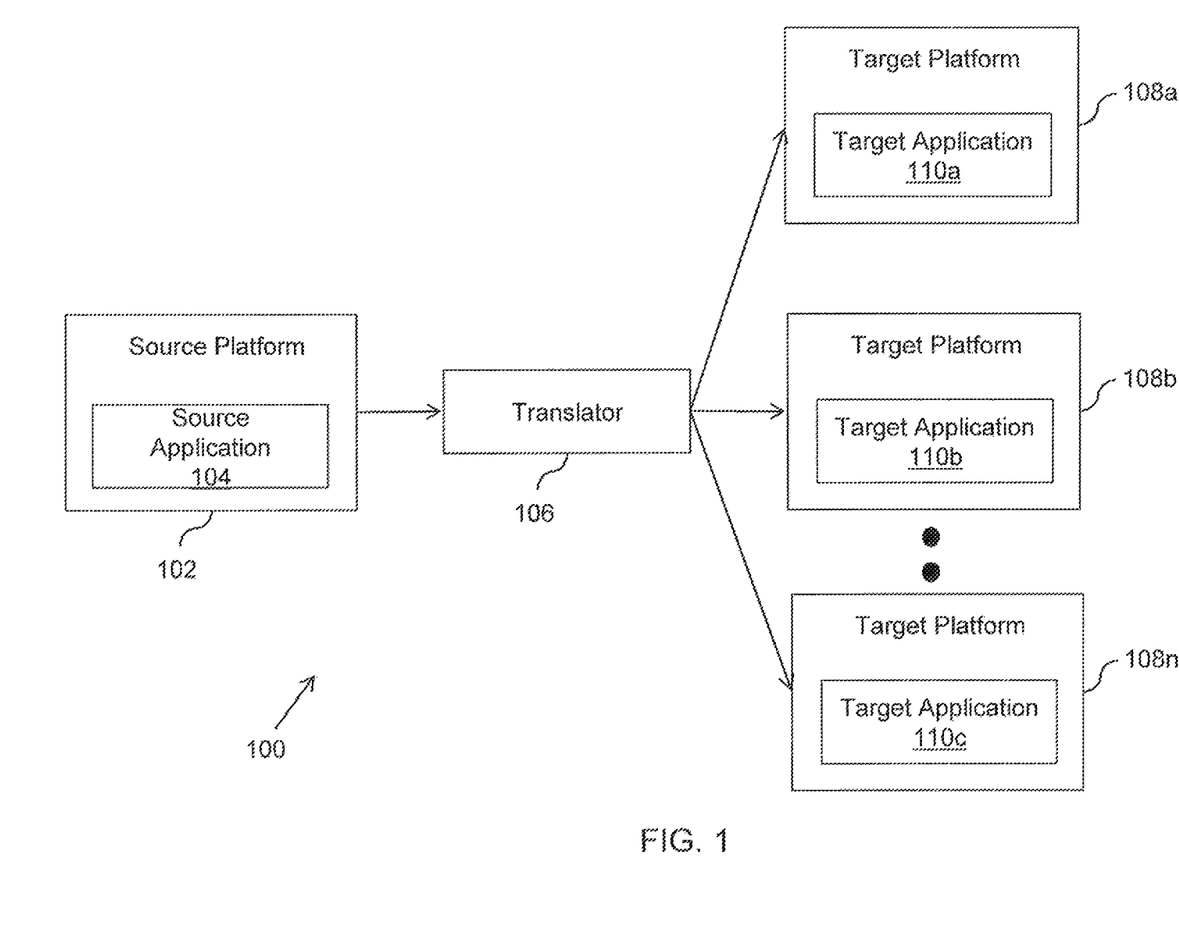
FIG. 1 illustrates an environment where various embodiments of the invention may function.

FIG. 1 illustrates an exemplary environment 100 where the embodiments of the invention may function. Generally, computer applications may be designed for a particular platform of a device based on the characteristics of the platform. For example, characteristics may include, but are not limited to, the Operating System (OS), processor, memory, display capabilities, audio capability, video capability and so forth. Further, various platforms may only support applications written in specific programming languages. Therefore, the applications may be required to be translated for using them on target platforms. As shown with reference to FIG. 1, a translator 106 may translate a computer source application 104 of a source platform 102 to target application 110a-n of respective target platform 108a-n. Source application 104 may include source code in form of computer files. Source code can be for example, instructions written in a programming language such as, but not limited to, C, C++, JAVA, ASP, or other programming languages.

Typically, when translating a source code into one or more target languages, each source code may have multiple instances of look-alike code. The term "look-alike code" refers to code snippets that might be written differently, but essentially give the same output. For instance, consider exemplary code snippets:

Example Code Snippet 1:

```
1.   Function f1( )
2.   {
3.       int i; Object type: *s, *t;
4.       for( i = 0; i< 10; i++ ;
5.       *t++= *s++;
6.   }
```

Example Code Snippet 2:

```
1.   Function f2( )
2.   {
3.       Object type: source[10], target[10];
4.       for(unsigned char j = 0; j < 10; j++ )
5.       target[j] = source[j]
6.   }.
```

In the above example, it is clearly illustrated that even though the functions f1 and f2 include different control structures, however, they essentially provide the same output. Therefore, the functions f1 and f2 may be termed as look-alike codes. Accordingly, there is need for a process to quickly and effectively manage the translation of the source code that includes look-alike codes. The process is discussed in detail in conjunction with FIGS. 3 and 4.

Figure 2:
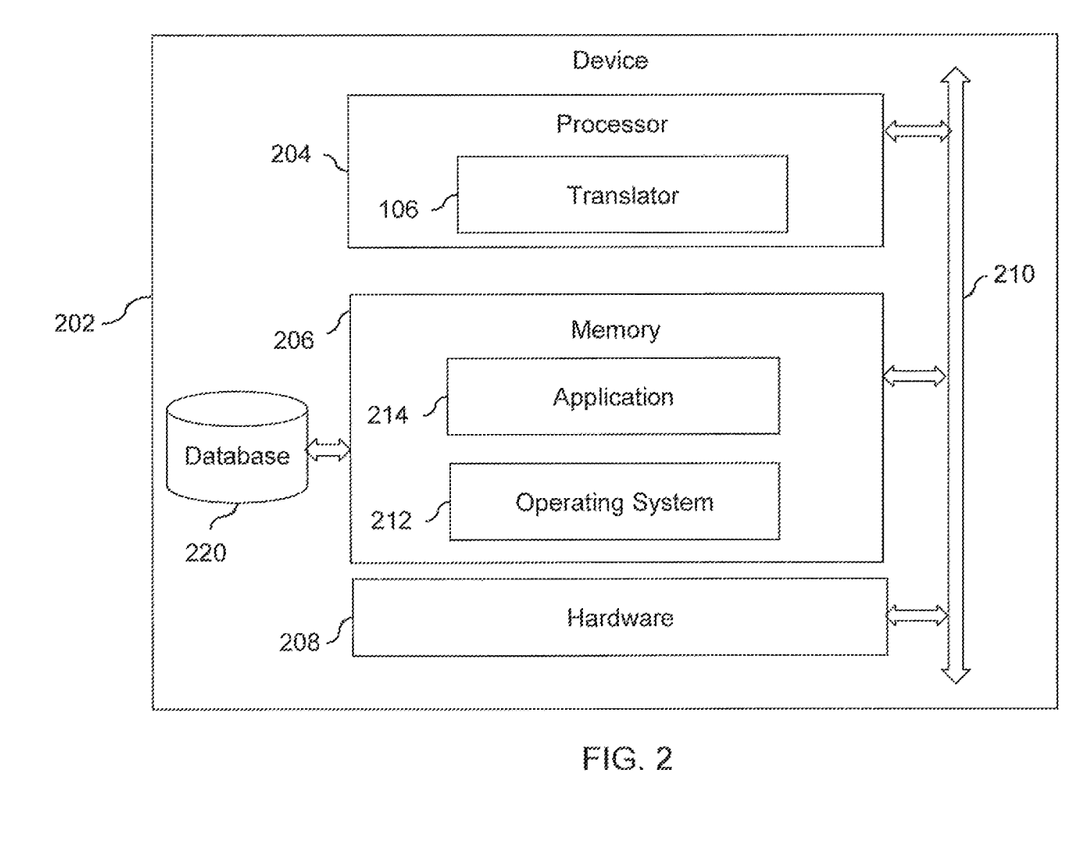
FIG. 2 illustrates a block diagram showing exemplary components of an processing device for implementing the invention, in accordance with an embodiment of the invention.

With reference to FIG. 2, exemplary components of a processing device 202 are illustrated where a translator 106 may be implemented. As shown, translator 106 may be a component of device 202; however, a person skilled in the art will appreciate that translator 106 may function as independent hardware, software or firmware. Device 202 may be a computer, a laptop, a mobile phone, a smartphone, and so forth. Further, device 202 may include a processor 204, a memory 206, and hardware 208. Hardware 208 may include various Input/Output (IO) modules, network interfaces, Graphical User Interface (GUI) or other hardware that enable device 202 to connect and/or communicate with other devices, hardware or users. Memory 206 includes application 214, and an OS 212 that supports functioning of various applications on device 202. Examples of OS 212 include, but are not limited to, Windows, Linux, Macintosh, Android, Symbian, and so forth.

Translator 106 may convert a source code of application 214 in a first programming language to a target code in one or more target programming languages. Further, the translator 106 may use information stored in a database 220 for the conversion. Database 220 may include information regarding the code snippets in multiple languages, data for identifying and processing look-alike codes and so forth. Database 220 and the functioning of translator 106 are explained in more detail in conjunction with FIGS. 3 and 4. Examples of memory 206 include a Read Only Memory (ROM), a Random Access Memory (RAM), a hard disk, a solid-state disk or any other media that can store instructions or data. Processor 204 can execute the information or data stored in memory 206. Processor 204, memory 206 and hardware 208 may communicate with each other through a system bus 210. Although not shown, a person skilled in the art will appreciate that device 202 may include various other components to enable its functioning.

Software may be downloaded, e.g., via an IO module, and may be stored in memory 206 or another memory medium for execution by processor 204. Furthermore, such software may be provided by another device for such downloading over a communication network.

Figure 3:
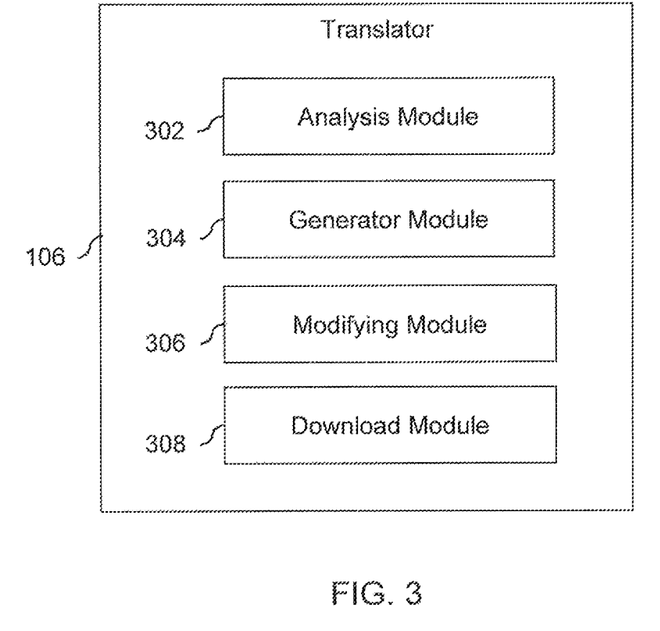
FIG. 3 illustrates various components of a translator for managing translation, in an embodiment of the invention.

FIG. 3 illustrates components of translator 106, in accordance with an embodiment of the invention. As discussed above, translator 106 can manage translation of a source code from the first programming language to one or more target programming languages. Translator 106 may include an analysis module 302 that may perform a pre-translation analysis of the source code. In case of pre-translation analysis, the source code may be parsed to analyze multiple parts such as features or code snippets of the source code. The analyses may be performed to identify look-alike code snippets in the source code. In an embodiment of the invention, the parsed code snippets may be stored in a database for the analysis. Further, analysis module 302 may determine the number of instances of each type of look-alike code, along with the location of each instance of the look-alike code in the source code. Moreover, analysis module 302 may search database 220 for pre-stored code snippets corresponding to the look-alike codes. In an embodiment of the invention, the pre-stored code snippets may be templates that can be used to replace the look-alike codes. Continuing with the above exemplary codes snippets of functions f1 and f2, the exemplary template can be such as:

```
1.   <Object type> T
2.       fn( const T* s, const T* t, int limit);
```

A generator module 304 may generate a report based on the analysis performed by analysis module 302. For example, the report may include information such as the look-alike codes, and parameters for look-alike codes such as number of instances, the information of templates, location such as line number of the look-alike codes in the source code and so forth. For example, the information may be in the form such that a a user or a programmer can interact with and select the snippets. Moreover, translator 106 may automatically select a template or code snippets from database 220.

A modifying module 306 may modify or replace each instance of the look-alike code with the templates or code snippets to generate an intermediate code based on the report.

The intermediate code may be in the same programming language as that of the source code that is the first programming language. In an embodiment of the invention, a programmer may prepare code snippets or templates for replacing the look-alike codes. Further, the code snippets provided by the programmer may be stored in database 220. Therefore, when similar look-alike code snippets are found, the pre-stored code snippets or code snippets stored by the programmer in database 220 may be used. As a result, translator 106 may update database 220 automatically based on the selection and inputs from the programmer on the report and the source code. Translator 106 may also include a download module 308 to download the executable instructions, for performing the above mentioned processes. In an embodiment of the invention, download module 308 may download the instructions from the Internet or a computer media.

Figure 4A:
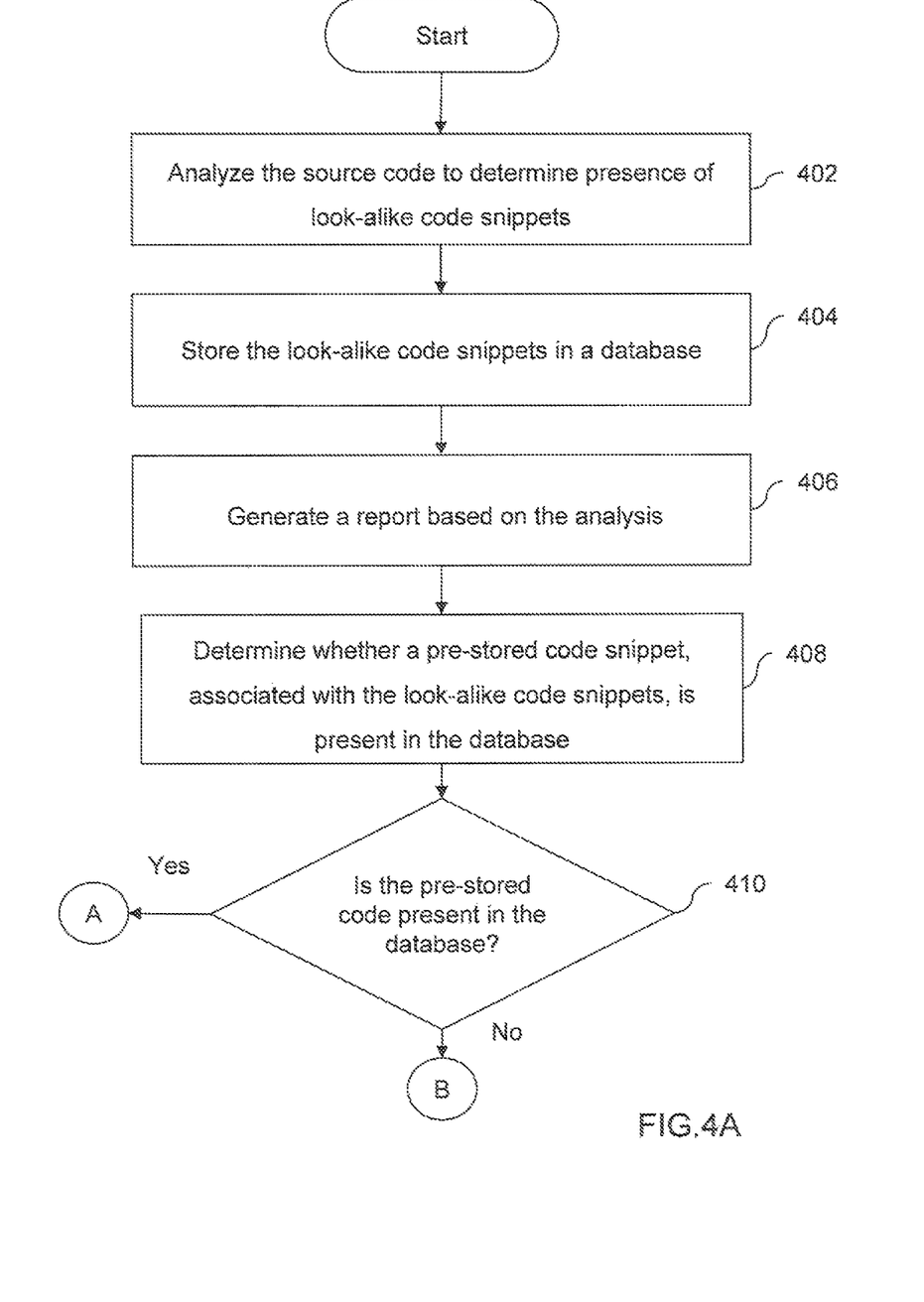
FIGS. 4A, 4B, and 4C are flowcharts illustrating a method for managing translation of a computer program source code in accordance with an embodiment of the invention.
Figure 4B:
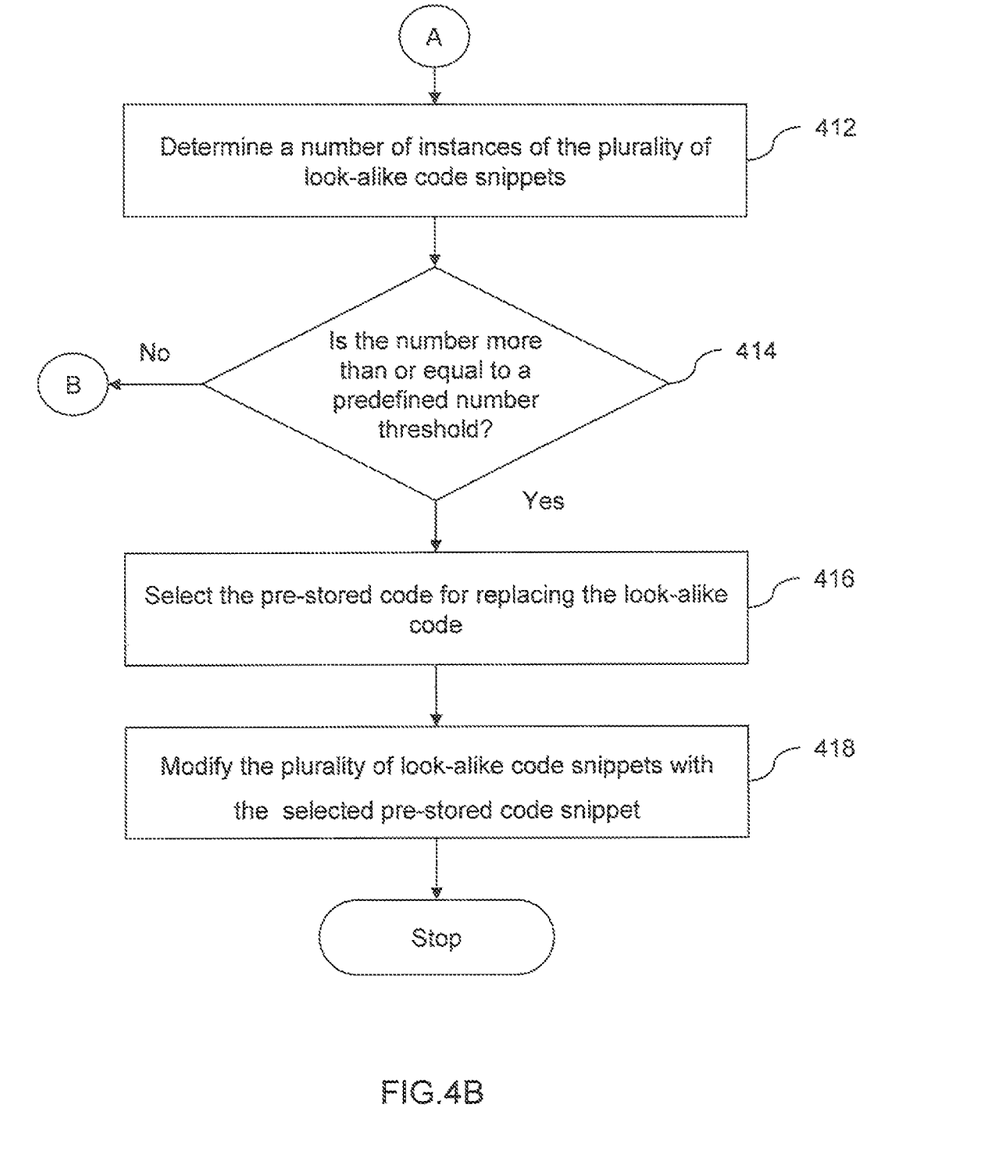
Figure 4C:
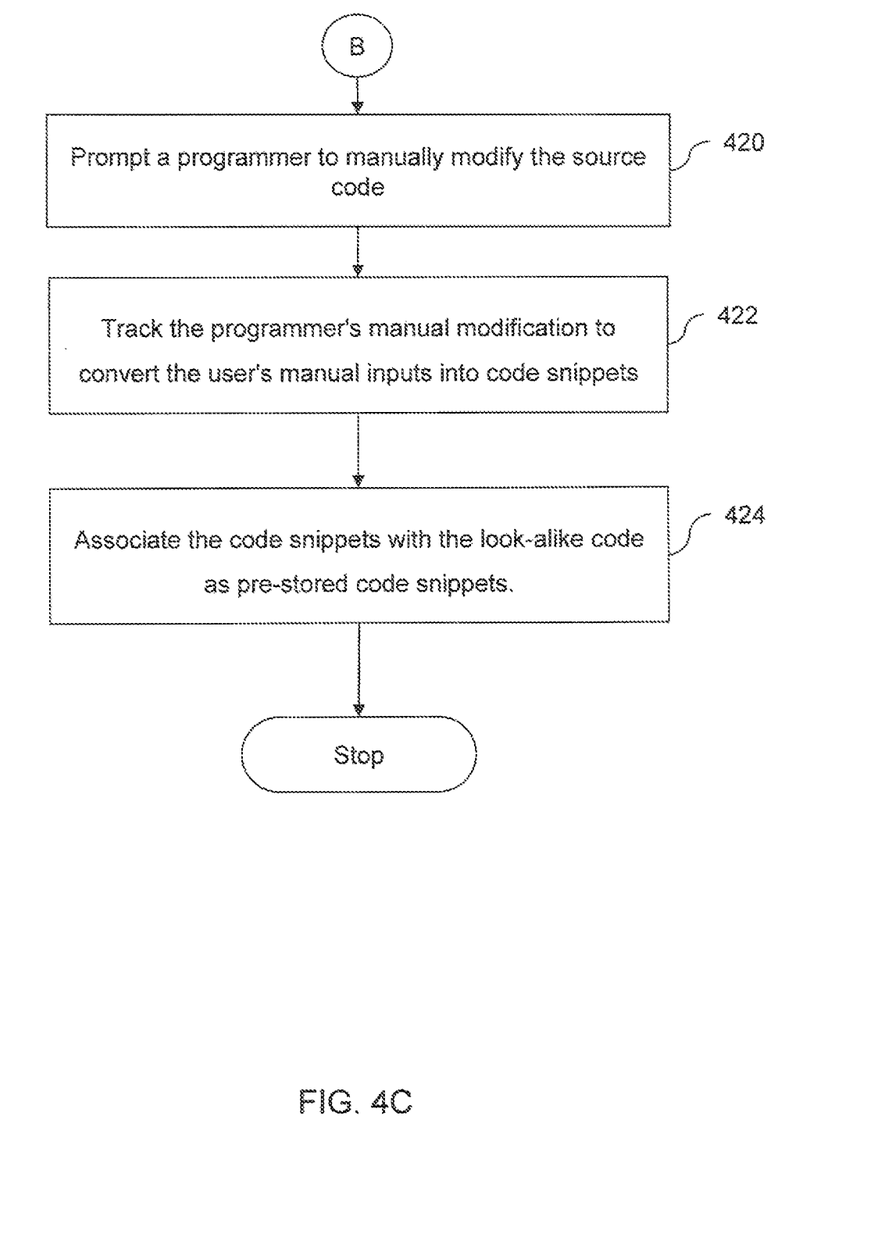

With reference to FIGS. 4A, 4B, and 4C, flow diagrams for managing quicker translation of a source code according to various embodiments of the invention are depicted. The process depicted can also be implemented in a processing device. Further, it should also be realized that process includes functionality that may be performed in hardware, firmware, software, or a combination thereof and may further be performed at a single hardware device or a combination of hardware devices at multiple devices. Also, one or more steps of the process can be facilitated by supporting external hardware units. Further, the various steps in the process may be executed by processor 204.

The source code in a first programming language of a computer application may be desired to be translated to a target code in a second programming language. At step 402, a pre-translation analysis of the source code may be performed. The term 'pre-translation analysis' refers to an analysis of the source code that may be done before the actual translation into the target code of the target language. During the pre-translation analysis the source code may be parsed to determine parts or code snippets of the source code that may be look-alike codes. The parts of the source code that may be examined may include, but are not limited to, functions, data types, syntaxes, control structures, Application Program Interface (API) functions, and so forth. The look-alike codes may be identified by parsing the source code. Further, the output of the code snippets may be compared to identify the look-alike codes. Moreover, the look-alike codes may be identified based on the pattern of the code snippets.

Subsequently at step 404, the look-alike codes may be stored in a database, such as database 220. Thereafter, at step 406 a report may be generated based on the analysis of the source code. The report may include for example, but is not limited to, a location of the look-alike codes, a description of the look-alike codes, and a number of instances of the look-alike codes. It should be understood by one with ordinary skill In the art that the listed parameters are illustrative examples; additional parameters for optimization of the translation can also be incorporated in the report. Moreover, the report may also be presented to the programmer for his inputs. For example, the report may be displayed on a device of the programmer. Subsequently, at step 408 the processor 204 may determine whether a pre-stored code snippet for replacing the look-alike code is present in the database 220. When the pre-stored code is not present in the database 220, the process may then continue to step 420 (in FIG. 4C). At step 420, the programmer may be prompted to manually provide a code snippet or template for the look-alike codes. Thereafter, at step 422, the code snippet or template for the look-alike codes provided by the programmer may be tracked and re-sourced. In an embodiment of the invention, re-sourcing may refer to updating and/or adding the code snippet or the template provided by the programmer, in the database 220. At step 424, the inputs or code snippets provided for the look-alike code may then be stored in database 220. Therefore, whenever a similar look-alike code is determined, the code snippets or template provided by the programmer can be used to modify the source code and generate the intermediate code.

When the pre-stored code is present in the database 220, the process continues to step 412 (in FIG. 4B). At step 412, the number of instance of the look-alike code may be determined. In the case where the number of instances of look-alike codes is less than a predefined threshold number, then the process may continue to step 420. When the number of instances of the look-alike codes is equal to or more than the predefined threshold number, then the process may continue to step 416. At step 416, processor 204 may select a pre-stored code for replacing each instance of the look-alike code. The pre-stored code may be selected based on a rank or a weight associated with the pre-stored code and the analysis of the source code. The term rank or weight, used herein, can be described as a compatibility parameter between the pre-stored code and the look-alike code. For example, the pre-stored code with a same output as the look-alike code may be ranked higher than a pre-stored code with near similar output.

In one embodiment, the processor may select a super-set code snippet to replace each instance of the look-alike code. The term super-set code snippet as used herein can be defined as a code snippet that is universal or supported by both the first programming language and the target programming language. As a result, the time required for actual translation may be drastically reduced. Once the processor 204 selects the pre-stored code, each instance of the look-alike code may be replaced with the selected pre-stored code at step at step 418.

Thereafter, the intermediate code may be translated into target code. As a result of replacing the look-alike codes with the templates, the number of instances to be analyzed by translator 106 during translation may be reduced, thus reducing the time required for the actual translation.

Embodiments of the invention are described above with reference to block diagrams and schematic illustrations of methods and systems according to embodiments of the invention. It will be understood that each block of the diagrams and combinations of blocks in the diagrams can be implemented by computer program instructions. These computer program instructions may be loaded onto one or more general-purpose computers, special purpose computers, or other programmable data processing apparatus to produce machines, such that the instructions which execute on the computers or other programmable data processing apparatus create means for implementing the functions specified in the block or blocks. Such computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks. Furthermore, such computer program instructions may be made available for download and/or downloaded over a communication network.

While the invention has been described in connection with what is presently considered to be the most practical and various embodiments, it is to be understood that the invention is not to be limited to the disclosed embodiments, but on the contrary, is intended to cover various modifications and equivalent arrangements included within the spirit and scope of the appended claims.

This written description uses examples to disclose the invention, including the best mode, and also to enable any person skilled in the art to practice the invention, including making and using any devices or systems and performing any incorporated methods. The patentable scope the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for managing translation of a computer program source code in a first programming language, at a processing device, the method comprising:
   analyzing, by the processing device, the source code, prior to performing translation of the source code, to determine a plurality of look-alike code snippets;
   generating a report, by the processing device, to indicate at least one parameter associated with the plurality of look-alike code snippets;
   generating a super-set code snippet for at least one of the look-alike code snippets;
   associating the super-set code snippet with at least one of the look-alike code snippets;
   storing each super-set code snippet in a database;
   modifying, by the processing device, at least one of the plurality of look-alike code snippets by substituting with at least one pre-stored code snippet based on the at least one parameter, to generate intermediate code in the first programming language;
   modifying, by the processing device, at least one of the plurality of look-alike code snippets by substituting with at least one stored super-set code snippet based on the at least one parameter, to generate code that is supported by both the first programming language and at least one second programming language different from the first programming language; and
   translating the intermediate code into at least one second programming language different from the first programming language.

2. The method of claim 1, wherein each of the plurality of look-alike code snippets provides identical output.

3. The method of claim 1, further comprising storing the plurality of look-alike code snippets in a database.

4. The method of claim 1, wherein the at least one parameter is one of a location of each of the plurality of look-alike code snippets, a description of plurality of look-alike code snippets, or a number of instances of plurality of look-alike code snippets.

5. The method of claim 1, further comprising:
   determining whether the at least one pre-stored code snippet, associated with the at least one of the plurality of look-alike code snippets, is stored in the database; and
   determining a number of instances of the plurality of look-alike code snippets.

6. The method of claim 5, further comprising:
   modifying at least one of the plurality of look-alike code snippets with the at least one pre-stored code snippet, when the at least one pre-stored code snippet is available in the database and the number of instances of the plurality of look-alike code snippets exceeds a first threshold.

7. The method of claim 5, further comprising:
   prompting a user for a manual input, when the at least one pre-stored code snippet is unavailable in the database or the number of instances of the plurality of look-alike code snippets does not exceed a first threshold.

8. The method of claim 7, further comprising:
   tracking the manual input;
   re-sourcing the manual inputs as one or more code snippets in the database; and
   associating the one or more code snippets with the at least one of the plurality of look-alike code snippets.

9. The method of claim 8, further comprising storing in a database one or more snippets, provided by the user, corresponding to the at least one of the plurality of look-alike code snippets.

10. The method of claim 1, further comprising downloading executable instructions that, if executed by the device, cause the device to perform said analyzing, said generating, and said modifying.

11. The method of claim 1, further comprising providing for downloading executable instructions that, if executed by a processor, cause the processor to perform said analyzing, said generating, and said modifying.

12. The method of claim 1, further comprising:
   ranking the at least one pre-stored code snippet that is associated with the at least one of the plurality of look-alike code snippets; and
   selecting the at least one pre-stored code snippet based on the at least one parameter and the rank of the at least one pre-stored code snippet.

13. A non-transitory computer-readable medium having stored thereon instructions that, if executed by a processor, cause the processor to execute a method for managing translation of a computer program source code in a first programming language, the method comprising:
   analyzing the source code, prior to performing translation of the source code, to determine a plurality of look-alike code snippets;
   generating a report to indicate at least one parameter associated with the look-alike code snippets;
   generating a super-set code snippet for at least one of the look-alike code snippets;
   associating the super-set code snippet with at least one of the look-alike code snippets;
   storing each super-set code snippet in a database;
   modifying at least one of the plurality of look-alike code snippets by substituting with at least one pre-stored code snippet, based on the parameter, to generate intermediate code in the first programming language;
   modifying at least one of the plurality of look-alike code snippets by substituting with at least one stored super-set code snippet based on the at least one parameter, to generate code that is supported by both the first programming language and at least one second programming language different from the first programming language; and
   translating the intermediate code into at least one second programming language different from the first programming language.

14. The computer-readable medium of claim 13, wherein each of the plurality of look-alike code snippets provides identical output.

15. The computer-readable medium of claim 13, further comprising instructions for storing the plurality of look-alike code snippets in a database.

16. The computer-readable medium of claim 13, wherein the at least one parameter is one of a location of each of the plurality of look-alike code snippets, a description of plurality of look-alike code snippets, or a number of instances of plurality of look-alike code snippets.

17. The computer-readable medium of claim 13, further comprising instructions for:
- determining whether the at least one pre-stored code snippet, associated with the at least one of the plurality of look-alike code snippets, is stored in the database; and
- determining a number of instances of the plurality of look-alike code snippets.

18. The computer-readable medium of claim 17, further comprising instructions for:
- modifying at least one of the plurality of look-alike code snippets with the at least one pre-stored code snippet, when the at least one pre-stored code snippet is available in the database and the number of instances of the plurality of look-alike code snippets exceeds a first threshold.

19. The computer-readable medium of claim 17, further comprising instructions for:
- prompting a user for one or more inputs, when the at least one pre-stored code snippet is unavailable in the database or the number of instances of the plurality of look-alike code snippets does not exceed a first threshold.

20. The computer-readable medium of claim 19, further comprising instructions for:
- tracking the inputs;
- re-sourcing the manual input as one or more code snippets in the database; and
- associating the one or more code snippets with the at least one of the plurality of look-alike code snippets.

21. The computer-readable medium of claim 20, further comprising instructions for storing in a database one or more snippets, provided by the user, corresponding to the at least one of the plurality of look-alike code snippets.

22. The computer-readable medium of claim 13, further comprising instructions for:
- ranking the at least one pre-stored code snippet that is associated with the at least one of the plurality of look-alike code snippets; and
- selecting the at least one pre-stored code snippet based on the at least one parameter and the rank of the at least one pre-stored code snippet.

23. A system for managing translation of a computer program source code in a first programming language, the system comprising:
- means for analyzing the source code, prior to translation of the source code, to determine a plurality of look-alike code snippets;
- means for generating a report to indicate at least one parameter associated with the look-alike code snippets;
- means for generating a super-set code snippet for at least one of the look-alike code snippets;
- means for associating the super-set code snippet with at least one of the look-alike code snippets;
- means for storing each super-set code snippet in a database;
- means for modifying at least one of the plurality of look-alike code snippets by substituting with at least one pre-stored code snippet, based on the parameter, to generate intermediate code in the first programming language;
- means for modifying at least one of the plurality of look-alike code snippets by substituting with at least one stored super-set code snippet, based on the parameter, to generate code that is supported by both the first programming language and at least one second programming language different from the first programming language; and
- means for translating the intermediate code into at least one second programming language different from the first programming language.

24. The system of claim 23, wherein each of the plurality of look-alike code snippets provides identical output.

25. The system of claim 23, further comprising means for storing the plurality of look-alike code snippets in a database.

26. The system of claim 23, wherein the at least one parameter is one of a location of each of the plurality of look-alike code snippets, a description of plurality of look-alike code snippets, or a number of instances of plurality of look-alike code snippets.

27. The system of claim 23, further comprising:
- means for determining whether the at least one pre-stored code snippet, associated with the at least one of the plurality of look-alike code snippets, is stored in the database; and
- means for determining a number of instances of the plurality of look-alike code snippets.

28. The system of claim 27, further comprising:
- means for modifying at least one of the plurality of look-alike code snippets with the at least one pre-stored code snippet, when the at least one pre-stored code snippet is available in the database and the number of instances of the plurality of look-alike code snippets exceeds a first threshold.

29. The system of claim 27, further comprising:
- means for prompting a user for one or more inputs, when the at least one pre-stored code snippet is unavailable in the database or the number of instances of the plurality of look-alike code snippets does not exceed a first threshold.

30. The system of claim 29, further comprising:
- means for tracking the inputs;
- means for re-sourcing the inputs as one or more code snippets in the database; and
- means for associating the one or more code snippets with the at least one of the plurality of look-alike code snippets.

31. The system of claim 30, further comprising means for storing, in a database, one or more snippets, provided by the user, corresponding to the at least one of the plurality of look-alike code snippets.

32. The system of claim 23, further comprising:
- means for ranking the at least one pre-stored code snippet that is associated with the at least one of the plurality of look-alike code snippets; and
- means for selecting the at least one pre-stored code snippet based on the at least one parameter and the rank of the at least one pre-stored code snippet.

33. An apparatus for managing translation of a computer program source code in a first programming language, the apparatus comprising:
- a memory for storing at least one pre-stored code snippet; and
- a processor communicatively coupled to the memory, wherein the processor is configured to:
    - analyze the source code, prior to performing translation of the source code, to determine a plurality of look-alike code snippets;
    - generate a report to indicate at least one parameter associated with the look-alike code snippets;
    - generate a super-set code snippet for at least one of the look-alike code snippets;
    - associate the super-set code snippet with at least one of the look-alike code snippets;
    - store each super-set code snippet in a database;

modify at least one of the plurality of look-alike code snippets by substituting with the at least one pre-stored code snippet, based on the parameter, to generate intermediate code in the first programming language;

modify at least one of the plurality of look-alike code snippets by substituting with at least one stored superset code snippet, based on parameter, to generate code that is supported by both the first programming language and at least one second programming language different from the first programming language; and translate the intermediate code into at least one second programming language different from the first programming language.

34. The apparatus of claim 33, wherein each of the plurality of look-alike code snippets provides identical output.

35. The apparatus of claim 33, wherein the processor is further configured to store the plurality of look-alike code snippets in a database.

36. The apparatus of claim 33, wherein the at least one parameter is one of a location of each of the plurality of look-alike code snippets, a description of plurality of look-alike code snippets, a number of instances of plurality of look-alike code snippets, or the at least one pre-stored code snippet for replacing the at least one of the plurality of look-alike code snippets.

37. The apparatus of claim 33, wherein the processor is further configured to:
determine whether the at least one pre-stored code snippet, associated with the at least one of the plurality of look-alike code snippets, is stored in the database; and
determine a number of instances of the plurality of look-alike code snippets.

38. The apparatus of claim 37, wherein the processor is further configured to:
modify at least one of the plurality of look-alike code snippets with the at least one pre-stored code snippet, when the at least one pre-stored code snippet is available in the database and the number of instances of the plurality of look-alike code snippets exceeds a first threshold.

39. The apparatus of claim 37, wherein the processor is further configured to:
prompt a user for one or more inputs, when the at least one pre-stored code snippet is unavailable in the database or the number of instances of the plurality of look-alike code snippets does not exceed a first threshold.

40. The apparatus of claim 39, wherein the processor is further configured to:
track the inputs;
re-source the inputs as one or more code snippets in the database; and
associate the one or more code snippets with the at least one of the plurality of look-alike code snippets.

41. The apparatus of claim 40, wherein the processor is further configured to store, in a database, one or more snippets, provided by the user, corresponding to the at least one of the plurality of look-alike code snippets.

42. The apparatus of claim 33, wherein the processor is further configured to:
rank the at least one pre-stored code snippet that is associated with the at least one of the plurality of look-alike code snippets; and
select the at least one pre-stored code snippet based on the at least one parameter and the rank of the at least one pre-stored code snippet.

* * * * *